(No Model.)
H. E. THOMAS.
SURF POWER PUMP.
No. 450,434. Patented Apr. 14, 1891.
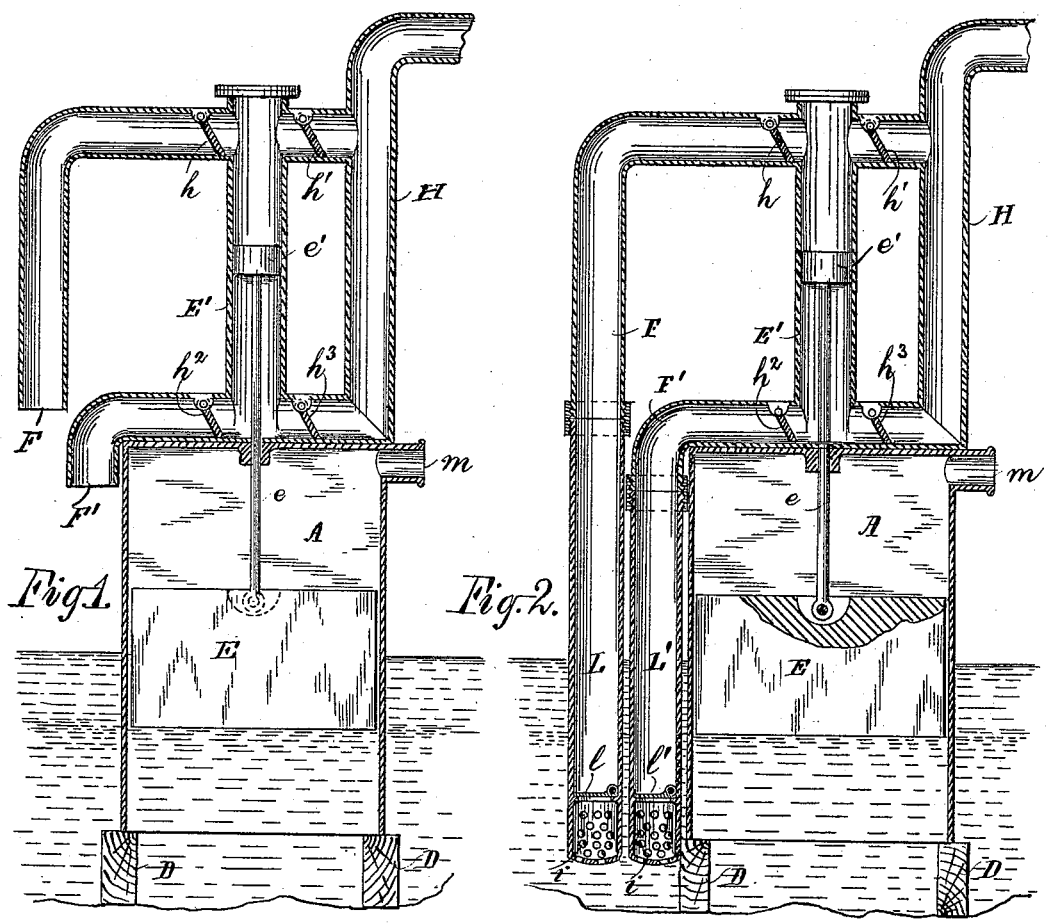
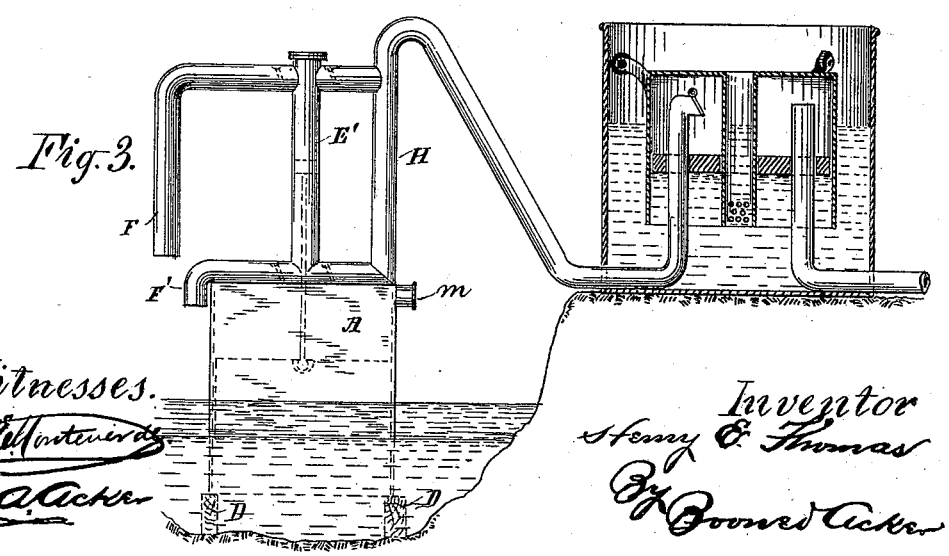
Witnesses.
Inventor
Henry E. Thomas

UNITED STATES PATENT OFFICE.

HENRY E. THOMAS, OF SAN FRANCISCO, CALIFORNIA, ASSIGNOR OF ONE-HALF TO FREDERICK H. HAUSMAN, OF SAME PLACE.

SURF-POWER PUMP.

SPECIFICATION forming part of Letters Patent No. 450,434, dated April 14, 1891.

Application filed April 1, 1890. Renewed January 13, 1891. Serial No. 377,594. (No model.)

*To all whom it may concern:*

Be it known that I, HENRY E. THOMAS, a citizen of the United States, residing at the city and county of San Francisco, and State of California, have invented certain new and useful Improvements in Surf-Power Pumps; and I do hereby declare the following to be a full, clear, and exact description of said invention, such as will enable others skilled in the art to which it most nearly appertains to make, use, and practice the same.

My invention relates to certain new and useful improvements in surf-power pumps for the utilization of the inflow or outflow of the waves as a motor-power for the purpose of pumping water or forcing a current of air from a point in the surf or tide-water by the pulsation thereof to a given point on the shore, as will be hereinafter more fully set forth and described.

My invention relates more particularly to an improvement upon the surf-power machine granted to me on the 10th day of December, 1889, No. 416,972. The patent or invention therein shown and described relates to utilizing the pulsation of waves, &c., for the conveying of a continuous current of fresh air through long distances, as fully set forth in said patent.

My present invention consists in providing a pump whereby a current of fresh air is conveyed both upon the upward and downward movement of the piston by the pulsation of the waves, and which at the same time may be readily converted into a pump for the conveyance or discharge of water by both the upward and downward stroke of the piston, thereby permitting either a supply of air or water to be utilized as a motor-power for air or water engines.

Referring to the drawings forming a part of this application, in which similar letters of reference are used to denote corresponding parts throughout the entire specification and several views of the drawings, Figure 1 is a sectional elevation of my improved surf-pump with the water-pipes removed; Fig. 2, a similar view showing the pipes connected for the purpose of converting the air-pump into an automatic water-pump; and Fig. 3, a view similar to Fig. 1, showing the pump connected to an accumulator.

The letter A represents the guiding chamber or casing, which by preference I construct rectangular in shape. This casing has closed sides and a partially-closed top, while the bottom is left open, and said casing is placed in the surf of the ocean or near the shore of any large body of water with its open bottom downward, which is mounted upon legs D, so that the mean level of the water will cover its sides to the height of a foot, (more or less.) The water will then stand inside the casing or chamber at a corresponding mean level. Inside this cylinder or casing I place a float E, to which is pivotally secured the piston-rod $e$, provided with the piston $e'$, which works in the stand-pipe or cylinder E', connected to the top of the chamber. As hereinafter described, by the employment of a piston operated by the float contained within the chamber I secure a more direct or positive stroke for the suction and discharge of the air or water. The stand-pipe or cylinder E' is provided with the upper and lower laterally-extending inlet-pipes F F', which at their inner ends connect with the supply-pipe H and have provided therein the inwardly-swinging valves $h\ h'\ h^2\ h^3$. The outer ends of said inlet-pipes are screw-threaded, so as to permit the water-pipes L L' to be attached thereto. These pipes extend below the surface of the water to a depth equal to that of the bottom of the chamber and have their lower ends closed and provided with a series of perforations $i$; but, if so desired, these may be dispensed with. Within the lower portion of said pipes I locate the inwardly-opening valves $l\ l'$, operating as will be fully described later on.

If so desired, my improved pump may be used in connection with an acccumulator, as shown in Fig. 3 of the drawings, preferably of the kind described in my prior patent, No. 416,972, and which, being fully set forth therein, need not be herein specifically referred to. However, I find that my pump may be used with equally good results without the employment of an accumulator by conveying directly from the supply-pipe H to the point of distribution.

When desired to be used as an air-pump, the pipes L L' are disconnected from the pipes F F', and the operation is as follows: The upward movement of the float E, by the movement of the waves, carries with it the piston-rod and piston $e'$, which movement causes a vacuum to be formed behind the piston-head within the stand-pipe E', and which opens the valve $h^2$ and causes an inflow of air through the pipe F' into the stand-pipe behind the piston. At the same time the air contained in the upper portion of the stand-pipe is caused by the upward pressure of the piston to force open the valve $h'$ and to close valve $h$ and allow the outflow of air from said pipe into the supply-pipe H, from whence it is conveyed by the continuous current of air to the desired point. Upon the downward movement of the piston the operation is the reverse of that previously described—that is, the downward pressure of the piston upon the air contained within the stand-pipe or cylinder behind the piston-head closes the valve $h^2$ and opens valve $h^3$, causing the air to flow into the supply-pipe H, while at the same time the vacuum created above the piston-head closes the valve $h'$ and opens valve $h$, so as to permit of an inflow of fresh air within the stand-pipe. It will thus be seen that I admit air into the stand-pipe or cylinder and discharge it into the supply-pipe upon each stroke of the piston or movement of the float.

In order to convert from an air into a suction pump, the pipes L L' are connected to the inlet-pipes F F', and, as before described, upon the upward movement of the piston the vacuum formed opens the valve $h^2$ and the valve $l'$ in the bottom of the water-pipe, which creates a suction sufficient to draw the water into pipe L', up through pipe F', and into the stand-pipe below the piston, while upon the downward stroke of said piston the valves $h^2$ and $l'$ are closed and valve $h^3$ thrown open, which causes the water to flow into the supply-pipe H, from whence it is conveyed to the point of distribution, while at the outflow of the water the vacuum created ahead of the piston or above opens valve $h$ and closes valve $h'$, thereby causing an inflow of water through the water-pipe L by the opening of valve $l$ by suction into and through pipe F to the stand-pipe above the piston, which water is discharged upon the upward stroke of the piston into supply-pipe H, as previously described. I thus create a continuous supply of water to the supply-pipe by the upward-and-downward stroke of the piston.

My pump is especially adapted for supplying water or air as a motive power for machinery or fresh air to dwellings or hospitals for cooling or ventilating purposes, inasmuch as it takes fresh and cool air from off the water and delivers it in an uncontaminated condition at the place of discharge. By providing suitable branch pipes (not shown) the air or water may be conveyed to different places, as desired. My invention is also adapted for the supplying of salt or fresh water for bathing purposes within a city from a body of water.

In order to provide for the escape of the air retained above the float within the tank, I form the opening $m$ in the top thereof, which upon the upward movement of the float expels the retained air, while upon the downward movement air is drawn in by suction.

I am aware that minor changes may be made in the arrangement of parts and details of construction herein shown and described without necessitating a departure from the nature and scope of my invention.

Having thus described my invention, what I claim as new, and desire to secure protection in by Letters Patent of the United States, is—

1. In a surf-power pump, the combination of an open-bottom guiding chamber or casing, a float within said chamber, a lower induction-pipe, similarly-opening valves within said pipe, an upper induction-pipe, similarly-opening valves within said upper pipe, a vertical stand-pipe or cylinder connecting the induction-pipes, a piston working within the cylinder and having its rod connected to the float, and a vertical eduction or supply pipe extending from the lower induction-pipe and communicating with the upper induction-pipe, substantially as set forth.

2. In a surf-power pump, the combination of upper and lower induction-pipes, a vertical communicating eduction or supply pipe, means for producing a continuous flow of water through said pipes by the pulsatory motion of the waves, and pipes suitably coupled to the lower ends of the induction-pipes, having lower perforated ends and provided with upwardly-opening valves, substantially as set forth.

In testimony whereof I affix my signature in the presence of two witnesses.

HENRY E. THOMAS.

In presence of—
 N. A. ACKER,
 F. H. HAUSMAN.